(No Model.)
C. W. COLLYER.
APPARATUS FOR ADMINISTERING MEDICINE TO ANIMALS.
No. 383,440. Patented May 29, 1888.
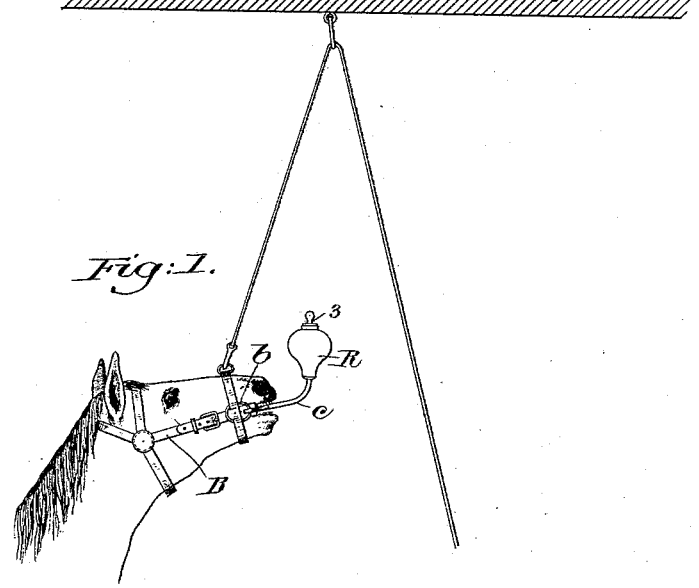
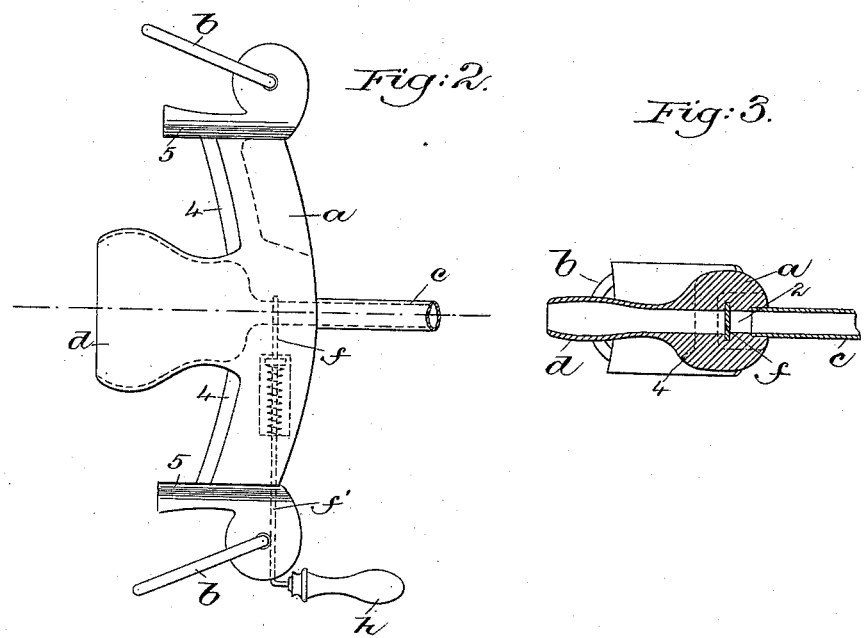
Witnesses.
Fred L. Emery.
Fred S. Greenleaf.
Inventor.
Charles W. Collyer.
by Crosby & Gregory Attys.

UNITED STATES PATENT OFFICE.

CHARLES W. COLLYER, OF HARRISBURG, PENNSYLVANIA.

APPARATUS FOR ADMINISTERING MEDICINE TO ANIMALS.

SPECIFICATION forming part of Letters Patent No. 383,440, dated May 29, 1888.

Application filed October 11, 1887. Serial No. 251,981. (No model.)

*To all whom it may concern:*

Be it known that I, CHARLES W. COLLYER, of Harrisburg, county of Dauphin, and State of Pennsylvania, have invented an Improvement in Apparatus for Administering Medicine to Horses and other Animals, of which the following description, in connection with the accompanying drawings, is a specification, like letters on the drawings representing like parts.

This invention has for its object to construct an apparatus for administering medicine to horses and other animals without danger to the person in charge and without wasting the medicine.

In accordance with this invention a bit composed of a bar having suitable eyes or rings, by which it is attached to the cheek-straps of an ordinary bridle, is provided with a transverse hole, which receives a pipe joined to a suitable reservoir, the side of the bit opposite the pipe having a hollow flat projection or tongue communicating with or in line with the hole in the bit, so that the medicine contained in the reservoir may pass down the pipe, thence through the bit transversely, and out through the said hollow projection well into the mouth of the animal. When the bit is placed in position, the flat projection lies upon the tongue of the animal. A suitable valve is provided, preferably in the bit, to control the passage of liquid material from the reservoir.

Figure 1 shows in side elevation, in connection with a horse's head, an apparatus embodying this invention for administering medicine to a horse; Fig. 2, a top view of the apparatus, showing the valve in dotted lines; and Fig. 3, a vertical section of the apparatus taken on the dotted line *x x*, Fig. 2.

The bit is composed, essentially, of a bar, *a*, having at each end a ring or eye, *b*, for attaching the bit to the usual cheek-straps of the bridle B. The bar *a* has a hole, 2, cut through it transversely, as shown in Fig. 3, into which is fitted one end of a pipe, *c*, suitably bent and connected with a reservoir, R, made of any suitable shape and material, the said pipe *c* conducting the medicine or liquid material from the reservoir. The reservoir is provided with a suitable stopper, 3. A flat tubular projection, as *d*, is attached to or formed integral with the bar *a* at that side opposite the pipe *c*, said projection *d* being made hollow and communicating with the hole 2, cut in the bar *a*, thereby affording a free passage for the liquid material from the reservoir R through the pipe *c*, hole 2, and projection *d*.

The flat projection *d* lies upon the tongue of the horse or other animal to which the medicine is being administered.

The valve, herein shown as a spring-controlled slide-valve, *f*, (see dotted lines, Fig. 2,) is placed within the bar *a*, and is adapted to open and close the passage through the bar, such valve being attached to the end of a stem, *f'*, provided at its opposite end with a suitable handle, *h*, for moving it.

The bar *a* at its lower side for its entire length is provided with a flange, 4, (see Fig. 2 and dotted lines, Fig. 3,) and near each end of the bar other flanges, 5, project, which flanges aid in preventing the liquid material from running from the mouth.

In using the apparatus the reservoir R is filled with medicine, the bit attached to the bridle in the same manner as an ordinary bridle-bit and placed in the mouth of the horse or other animal, the head of the animal being held up by a suitable cord or chain, one end of which is attached to a ring on the nose-band, and the other end passes up through a ring on the ceiling and hangs within easy reach of the person in charge, as shown in Fig. 1, the cord being drawn taut to keep the head up.

By this apparatus it will be seen that medicine may be easily given vicious animals without danger to the person in charge and without losing a portion of the medicine.

I claim—

1. In an apparatus for administering medicine to horses and other animals, a bit provided at its center with a transverse liquid-passage, combined with a closed reservoir containing the liquid material, and a conducting-pipe communicating directly with the said transverse liquid-passage and fitting into the outer end of the same, substantially as described.

2. In an apparatus for administering medicine to horses and other animals, the bit having a liquid-passage and a hollow flat projection communicating therewith, combined with flanges at each end of the bit, substantially as described.

3. In an apparatus for administering medicine to horses and other animals, the bit having a liquid-passage and a hollow flat projection communicating therewith, combined with the flanges at each end of the bit, and the flange projecting from the lower side of the bit for substantially its entire length, as and for the purposes set forth.

4. In an apparatus for administering medicine to horses and other animals, the bit having the liquid-passage integral therewith, combined with a spring-controlled valve for opening and closing said passage, substantially as described.

In testimony whereof I have signed my name to this specification in the presence of two subscribing witnesses.

CHARLES W. COLLYER.

Witnesses:
HENRY C. DEMMING,
JOHN H. HORNER.